J. P. Barker.
Excavator.

No. 22,847. Patented Feb. 8, 1859.

Witnesses:

Inventor,

UNITED STATES PATENT OFFICE.

JOS. P. BARKER, OF WAYNE, OHIO.

EARTH-EXCAVATOR.

Specification of Letters Patent No. 22,847, dated February 8, 1859.

*To all whom it may concern:*

Be it known that I, JOSEPH P. BARKER, of Wayne, in the county of Ashtabula and State of Ohio, have invented new and useful Improvements in Earth Scrapers and Excavators; and I do hereby declare that the following is a full and complete description of the construction and operation of the same, reference being had to the accompanying drawings, making part of this specification, in which—

Figure 3:
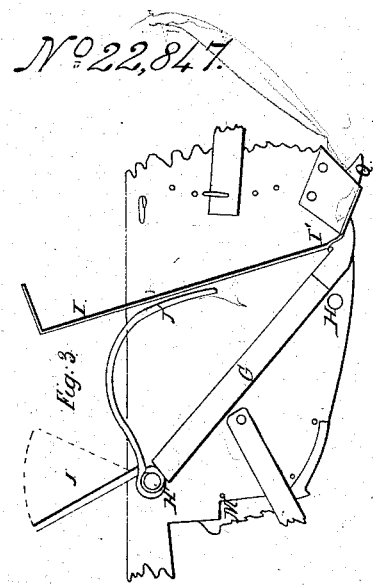
Figure 4:
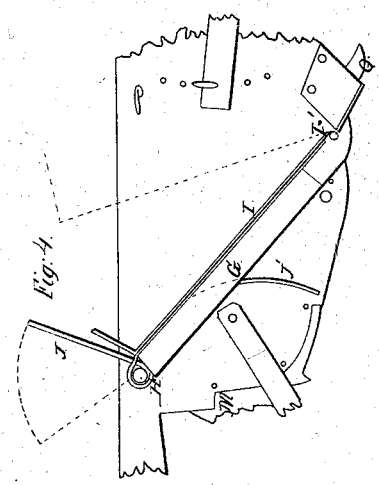
Figure 1:
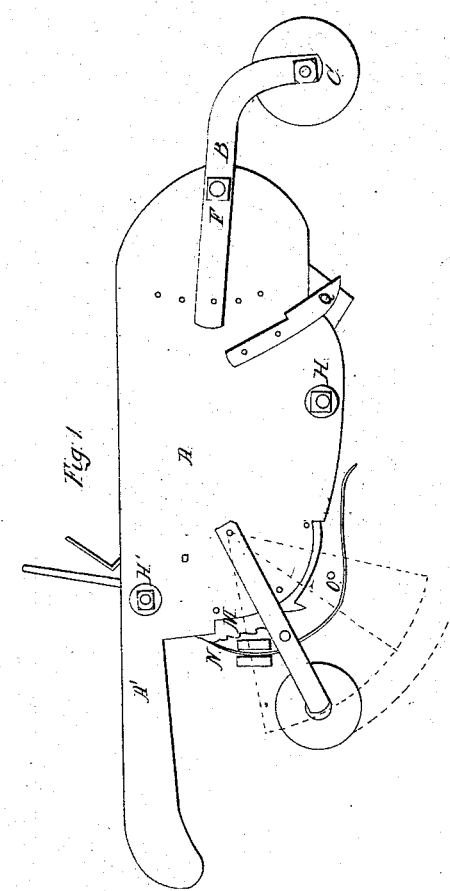
Figure 2:
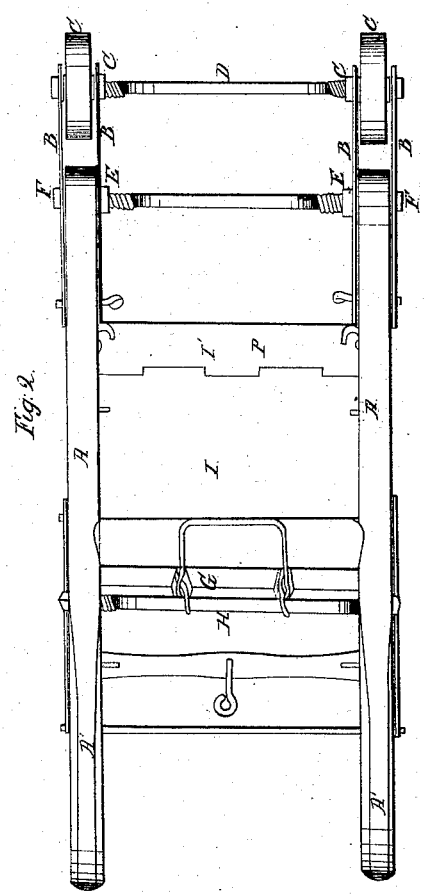

Figure 1, is a side view—Fig. 2, is a top view. Fig. 3 is a vertical section, showing the apron elevated, and Fig. 4, is a vertical section, showing the apron depressed.

The nature of my invention relates to the method herein described of arranging and adjusting the apron, so as conveniently to discharge the earth taken up, at any desirable point.

The sides of the scraper and excavator are made of plank, and are shown at A, Figs. 1 and 2. The handles A', extend backward, and are formed from the same piece of plank as are the sides A. At the forward end, there are two straps of iron, one upon each side of the side pieces—the same being seen at B, B, projecting forward and downward, and fitted to receive the journals C, C, of the wheels C', C'. The pieces B, B, articulate upon the rod D, which extends from one side plank to the other. A screw thread is cut upon each end of this rod, and a nut is placed both inside and outside of the side pieces A, and thus the pieces A are secured between them. These nuts are seen at E, F. The pieces B, B, are secured at the inner end, by a pin F'. A plank G, is placed between the side pieces at an angle of about forty-five degrees, a little back of the middle of the pieces A, and held in place by the rods H, H'. Upon the inclined plane thus formed rests the apron I. This is hinged at the bottom as seen at I'. Lying immediately behind this apron, is a bent lever J, having its fulcrum upon the rod H'. This lever is double, and its long arms are curved as seen at J'.

The rear end of the scraper and excavator, is supported by two wheels K Fig. 1, placed immediately below the handles A'. These are supported by the arms L. These arms articulate upon the pin L' and can be set in any desired position, and secured by the pawl and ratchet M, N. The pawl N, is kept in place by the spring O, which may be applied in any convenient manner.

The blade P, which penetrates the earth, is placed at the lower edge of the inclined plane G, to which it is properly secured by bolts. The ends are also turned at right-angles and are secured to the side pieces A. At each end of the blade, is attached a colter Q, which serves to divide the earth taken up from that which remains.

What I claim as my improvement and desire to secure by Letters Patent, is—

The manner of arranging and adjusting the apron, and operating the same by means of the bent levers J, for the purpose of conveniently discharging the earth taken up at any desired point as set forth, and used in connection with the adjustable wheels as herein described.

JOS. P. BARKER.

Witnesses:
J. BRAINERD,
J. LEONARD.